Aug. 15, 1961  E. L. WOOD  2,996,336
TIRE TRIM-WHEEL TRIM CONSTRUCTION
Filed July 15, 1957  4 Sheets-Sheet 2
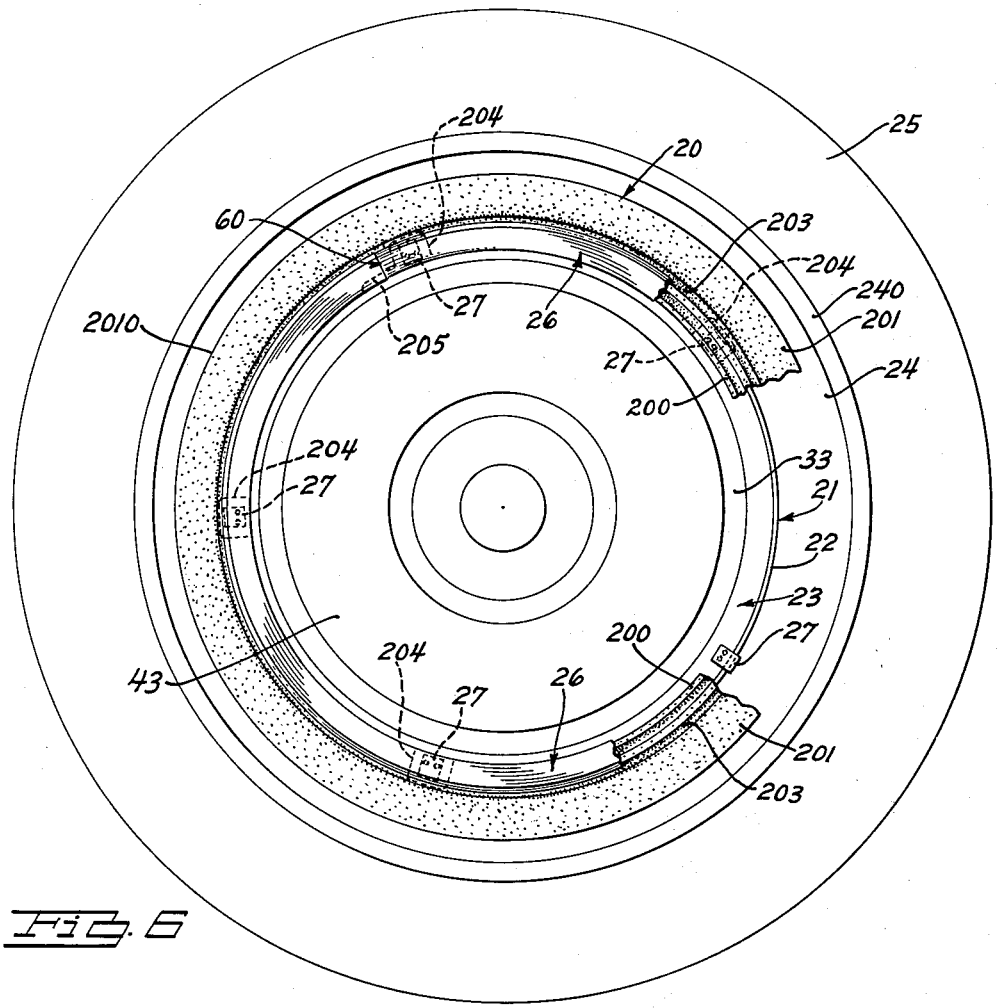
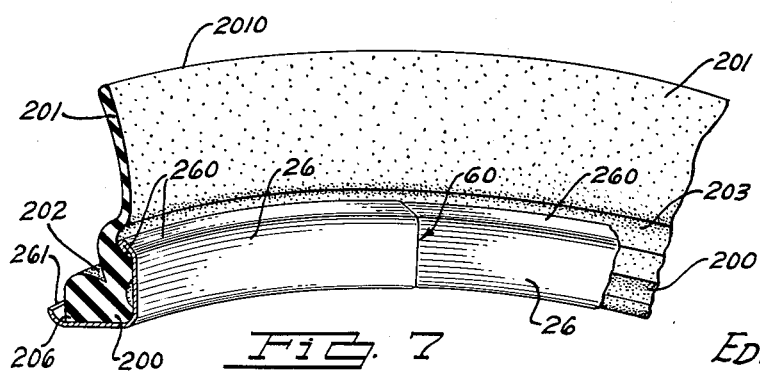
INVENTOR.
EDWARD L. WOOD
BY
ATTORNEY Aug. 15, 1961 E. L. WOOD 2,996,336
TIRE TRIM-WHEEL TRIM CONSTRUCTION
Filed July 15, 1957 4 Sheets-Sheet 3
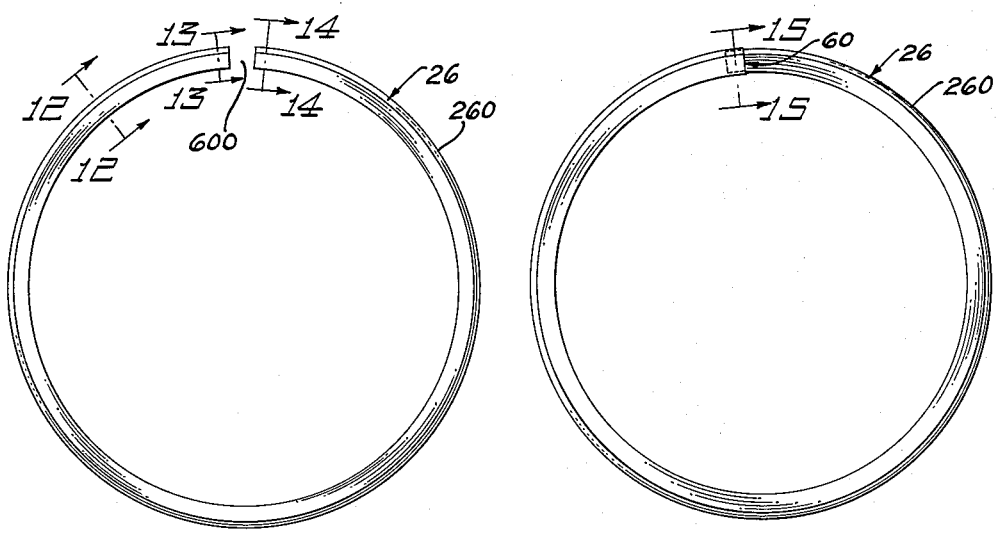
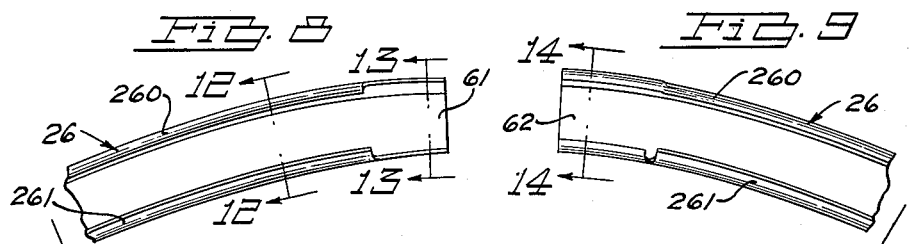
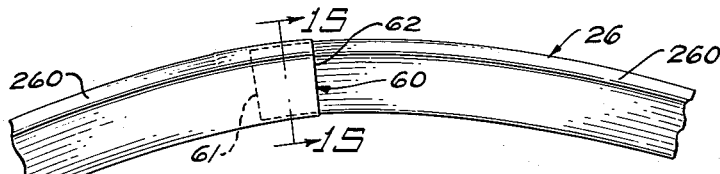
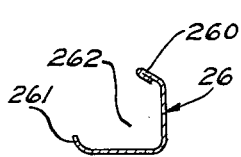 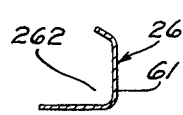 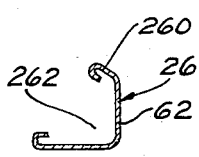 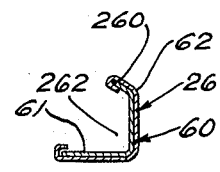
INVENTOR.
EDWARD L. WOOD
BY
*Everett G. Wright*
ATTORNEY

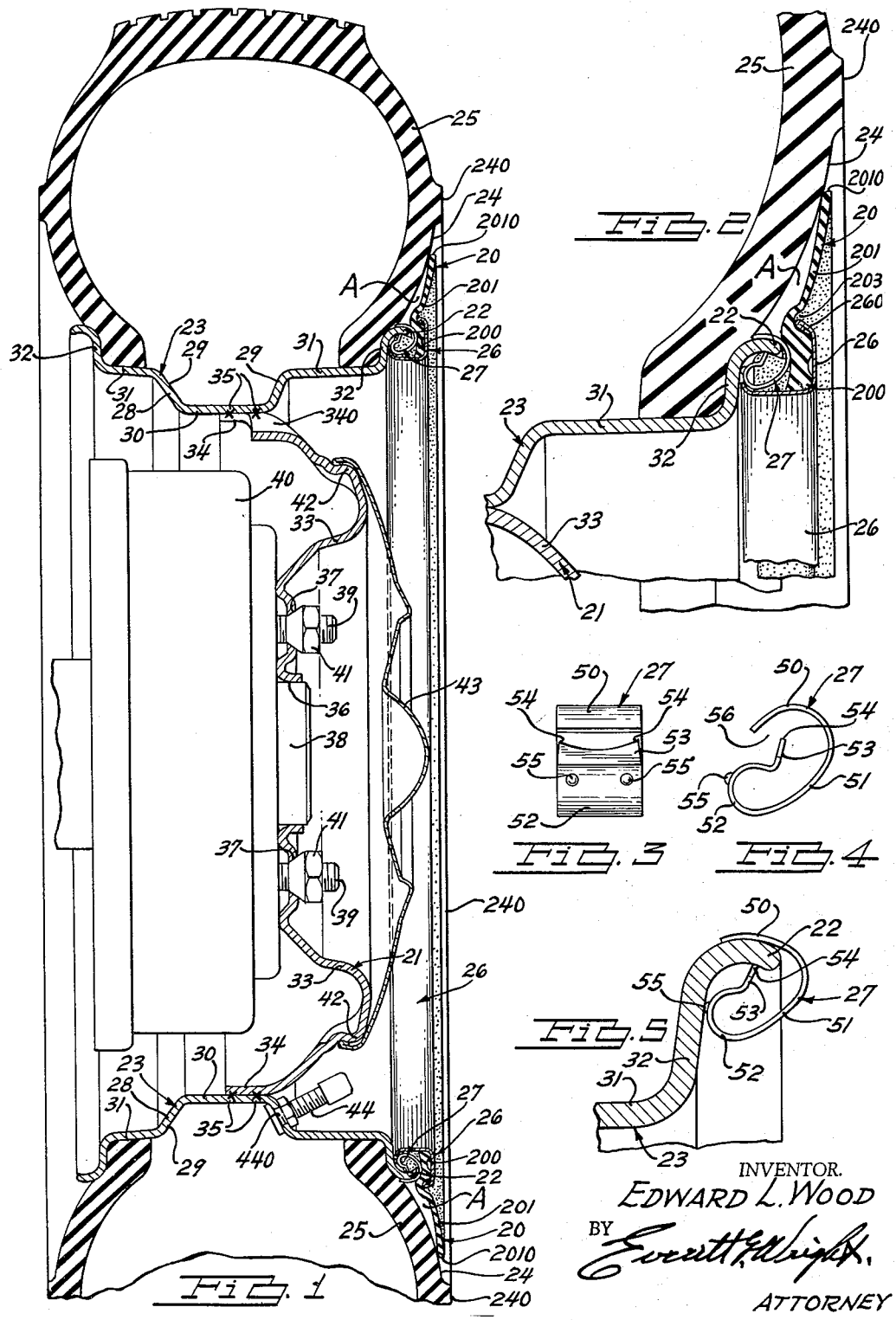

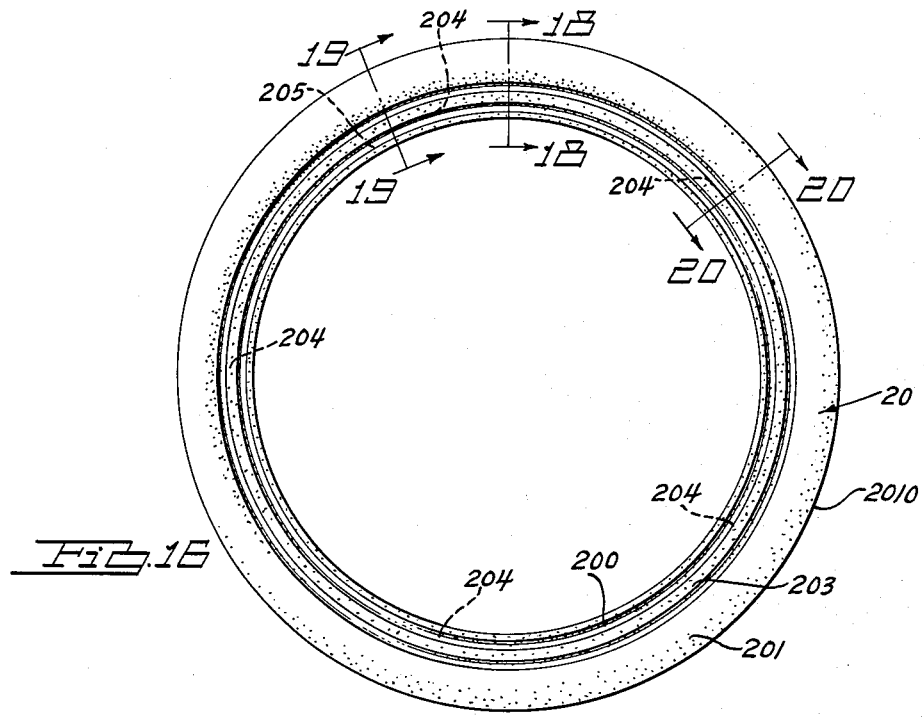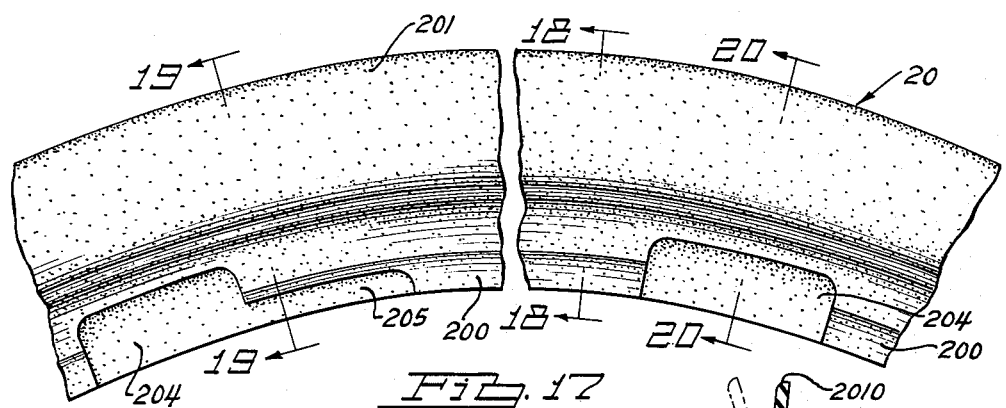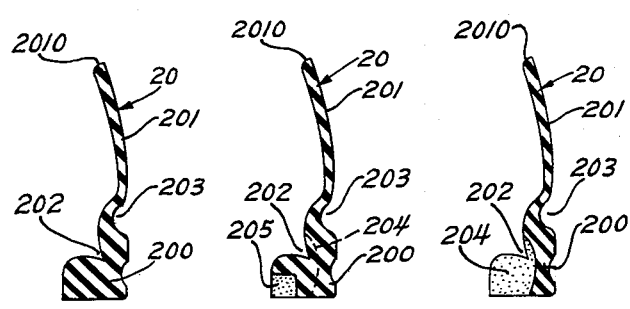

United States Patent Office 2,996,336
Patented Aug. 15, 1961

2,996,336
TIRE TRIM-WHEEL TRIM CONSTRUCTION
Edward L. Wood, 4684 Audubon, Detroit, Mich., assignor of one-half to Charles B. Aske, Jr., Birmingham, Mich.
Filed July 15, 1957, Ser. No. 671,839
7 Claims. (Cl. 301—37)

This invention relates to tire trim-wheel trim of the type employed to ornamentally trim the side walls of tires of automotive vehicles and to ornamentally trim the outer portion of the rim of the vehicle wheels upon which the tires are mounted.

Conventional white or colored side wall tire construction is deemed undesirable because of the high cost of manufacture and the fact that the white or colored rubber built into tire walls ofttimes discolors and crazes long before the safe useful mileage of the tire has been consumed. Also, in the manufacture of conventional white or colored side wall tires, many rejects occur due to flaws which develop in the white or colored wall portion thereof during molding. And, in addition, the automobile dealer is placed to extra expense in changing from black wall tires to white side wall tires and vice versa to suit the customer's wishes.

Many attempts have been made to trim the side walls of tires by fixing thereto an annular strip of white or other colored rubber to provide a white or colored side wall effect without having to build the white or other colored side wall integrally into the tire casing. Because of the continued flexing and heating of tire side walls during use, the cementing or other means employed for fixing annular tire trim strips to the side walls of tires has proven unsatisfactory.

Also, the prior art method of providing an annular flap on the inner periphery of an annular tire trim strip and securing the tire trim strip to the tire by inserting the annular flap thereof between the tire and the flange of the wheel rim on which the tire is mounted is considered to be undesirable and unsatisfactory, particularly because such construction is apt to cause leakage between the tire bead and the wheel flange in modern tubeless tire installations, and generally because of the difficulty involved and the time required to mount both the tire and the tire trim accurately and correctly onto the rim of a vehicle wheel.

Difficulty has been encountered in manufacturing a single tire trim-wheel trim assembly and means for securing it to a vehicle wheel which would accommodate itself to the variations in wheel rim dimensions occurring in the production by different manufacturers of a given nominal size wheel. For example, nominal 14" wheels for passenger cars produced by different manufacturers have been found to vary as much as ⅛" in diameter at the lip of the wheel rim. Accordingly, to provide a practical yet inexpensive tire trim-wheel trim construction to accommodate most variations in wheel dimensions with a single production model, and yet fit the wheel and tire thereon with perfection, has been a considerable problem heretofore.

Some tire trim installations have been found to prevent the dissipation of heat normally generated in the walls of tires as the tires on the vehicle wheels flex responsive to contacting the road when the vehicle is driven at relatively high speeds in warm weather.

Furthermore, the friction between large areas of tire trim and the walls of tires over which the said tire trim is mounted ofttimes causes squeaking noises which become particularly noticeable when the vehicle is driven over relatively smooth roads.

With the foregoing in view, one object of the invention is to provide an improved tire trim-wheel trim construction for vehicle wheels having a tire thereon wherein centrifugal force generated by the turning of the vehicle wheels as the vehicle is driven expands the said tire trim-wheel trim construction both circumferentially and radially into an extremely firm concentric contact with the wheel rim upon which the said tire trim-wheel trim construction is mounted.

Another object of the invention is to provide an improved tire trim-wheel trim construction adapted to be secured by improved clip means onto the rim of vehicle wheels and extending over a portion of the wall of a tire mounted thereon whereby to trim the wheel flange and color stripe the tire, the said tire trim-wheel trim being assembled into a unit for axially positioning over said clip means onto a wheel rim over the lip thereof in a manner permitting centrifugal centering and tightening of the assembly in place during the rotation of the wheel when the vehicle is driven.

Another object of the invention is to provide an improved tire trim-wheel trim construction including clip means for securing the tire trim-wheel trim assembly firmly and concentrically on vehicle wheels wherein a single model for a nominal size wheel will securely fit onto many different wheels of the same nominal size but varying dimensionally therefrom.

Another object of the invention is to provide, in combination, an improved tire trim-wheel trim construction for vehicle wheels having tires thereon consisting of a relatively pliable molded rubber or synthetic rubber or plastic tire trim ring element which overlies and telescopes onto the lip of the wheel rim and extends radially outwardly therefrom to function as a white or color wall tire trim, spring clip means secured to the lip of the wheel rim in a vise-like biting engagement therewith and in spaced relationship therearound, and a circumferentially expansible wheel trim element assembled onto said tire trim element adapted to be sprung axially over said clip means and radially and circumferentially expanded to removably fix said tire trim-wheel trim elements into firm concentric engagement with said wheel rim, the said tire trim-wheel trim construction compensating for variations in manufacturer's dimensions of a given standard size vehicle wheel, and the said clip means functioning with an overcenter type action to permit removal of said tire trim-wheel trim assembly from said wheel without damage to said wheel trim element.

A further object of the invention is to provide an improved tire trim-wheel trim construction wherein the tire trim element is held in substantial spaced relationship from the tire wall except at the outer periphery of the said tire trim whereby to permit a constant circulation of ambient air between the tire wall and the wheel trim responsive to the flexing of the tire and thereby effectively cool the tire wall under the tire trim as the vehicle is being driven.

Still another object of the invention is to provide a tire trim-wheel trim construction adapted to be clipped axially onto a vehicle wheel and expand radially and circumferentially into firm contact with the lip of the wheel rim, and, at the same time, have a minimum contact between the tire trim and the tire wall to reduce friction therebetween and correspondingly reduce to an acceptable minimum the accompanying heating of the tire wall and squeaking noises that normally develop between the tire trim and the wheel trim.

Other objects of the invention will become obvious by reference to the following detailed description taken in connection with the accompanying drawings in which:

FIG. 1 is a vertical sectional view through a vehicle wheel and tire having thereon a tire trim-wheel trim assembly and securing means embodying the invention.

FIG. 2 is an enlarged fragmentary sectional view showing in detail and in their assembled relationship the several elements of the invention disclosed in FIG. 1.

FIGS. 3 and 4 are enlarged rear and side elevational views of the improved spring clip securing means preferably employed to removably secure the tire trim-wheel trim assembly axially and concentrically onto the vehicle wheel.

FIG. 5 is an enlarged fragmentary sectional view showing the attitude assumed by the spring clip securing means when positioned in a vise-like biting engagement onto the wheel rim.

FIG. 6 is an elevational view of the vehicle wheel with a tire mounted thereon, and with tire trim-wheel trim embodying the invention held axially and concentrically on the vehicle wheel and over the tire wall by the improved clip means preferably employed, certain portions being broken away to clearly show the relationship of the several elements of the invention.

FIG. 7 is an enlarged fragmentary perspective view showing the tire trim and wheel trim elements as assembled before being positioned over the securing clip means and onto the vehicle wheel.

FIG. 8 is a front elevational view of the wheel trim element as manufactured substantially circular but with open ends.

FIG. 9 is a front elevational view of the wheel trim element shown in FIG. 8 with its ends telescoped to provide a completed circular ring having a slip joint to permit expansion thereof.

FIG. 10 is an enlarged fragmentary rear elevational view of the wheel trim element as manufactured and as shown in FIG. 8 disclosing in detail a preferred manner of forming the open ends to permit them to be telescoped into a slip type expansion jointed circular wheel trim ring.

FIG. 11 is an enlarged fragmentary front elevational view showing the completed slip joint of the expandible circular wheel trim ring.

FIG. 12 is a cross sectional view taken on the lines 12—12 of FIGS. 8 and 10 showing the wheel trim ring as rolled.

FIG. 13 is a cross sectional view of the male end of the slip joint of the wheel trim ring taken on the lines 13—13 of FIGS. 8 and 10.

FIG. 14 is a cross sectional view of the female end of the slip joint of the wheel trim ring taken on the lines 14—14 of FIG. 10.

FIG. 15 is a cross sectional view through the completely telescoped slip joint of a completed circular trim ring taken on the lines 15—15 of FIGS. 9 and 11.

FIG. 16 is a front elevational view of a tire trim element preferably employed.

FIG. 17 is an enlarged fragmentary rear elevational view of the tire trim element shown in FIG. 16.

FIG. 18 is a detailed cross sectional view taken on the lines 18—18 of FIGS. 16 and 17.

FIG. 19 is a cross sectional view taken on the lines 19—19 of FIGS. 16 and 17.

FIG. 20 is a cross sectional view taken on the lines 20—20 of FIGS. 16 and 17.

FIG. 21 is a cross sectional view of the tire trim element similar to FIG. 18 showing the attitude assumed by the wall portion in respect to the bead portion thereof when the said tire trim element is mounted on a vehicle wheel, the attitude of the said wall portion as molded being shown in dot and dash lines.

Referring now to the drawings wherein like numerals refer to like and corresponding parts throughout the several views, the embodiment of the invention disclosed for illustrative purposes consists, in general, of a tire trim ring 20 of molded rubber, synthetic rubber or other suitable resilient material held firmly by wheel trim ring 26 onto the lip 22 of the rim 23 of a vehicle wheel 21 and over the wall 24 of a tire 25 mounted thereon, the said wheel trim 26 being secured on the said vehicle wheel rim 23 by suitable securing means such as the spring clips 27, all as hereinafter described in detail.

The tire trim ring 20 is formed with an annular bead portion 200 which has an annular wall portion 201 extending radially outwardly therefrom. The said annular bead portion 200 of the tire trim ring 20 is preferably provided wth an axially inwardly facing annular groove 202 to permit the said bead portion 200 to be axially telescoped onto the lip 22 of the rim 23 of the vehicle wheel 21. This groove 202 may be of any suitable shape; as, for example, it preferably may be substantially angular in cross section to abut on the lower side and on the end of the lip 22 of the wheel rim 23, or, it may be narrow to telescope neatly onto the said lip 22 of the wheel rim 23 in contact with both the lower and upper sides thereof and in abutment with the end thereof. The said annular bead portion 200 of the tire trim ring 20 preferably has suitable pockets or notches 204 molded therein at intervals around the inner annular portion thereof to accommodate the clips 27. A suitable notch 205 is also molded in the annular bead portion 200 of the tire trim ring 20 adjacent and in communication with one of the said clip notches 204. The said notch 205 accommodates the slip joint 60 of the wheel trim 26 hereinafter described in detail.

The axially outer face of the said tire trim ring 20 is preferably annularly grooved at 203 to accommodate the radially outer axially disposed annular inturned flange 260 of the wheel trim ring 26 when the said tire trim ring 20 and the wheel trim ring 26 are assembled into the unitary tire trim-wheel trim assembly 20 and 26 as indicated in FIGS. 1, 2 and 7. This axially outwardly facing groove 203 in the tire trim ring 20 is preferably located substantially at the juncture of the annular bead portion 200 and the annular wall portion 201 of the tire trim ring 20, which location is somewhat radially outwardly in respect to the axially inwardly facing groove 202 in the bead portion 200 thereof.

It is preferable that the tire trim ring 20 and the wheel trim ring 26 be interlocked into a unitary tire trim-wheel trim assembly 20 and 26 as indicated in FIG. 7 before being mounted onto the vehicle wheel 21 over the lip 22 of the rim 23 thereof with the wheel trim ring 26 in engagement with the spring securing clips 27 which are fixed with a vise-like biting engagement onto the said lip 22 of the wheel rim 23 at intervals therearound. As best shown in FIGS. 1 and 2, the tire trim-wheel trim construction is preferably such that, when properly positioned onto a vehicle wheel, an air space A is provided between the wall 24 of the tire 25 and the axially inner face of the wall portion 201 of the tire trim ring 20 except at the extreme outer periphery of the said wall portion 201 of the tire trim ring 20 where it resiliently contacts the said wall 24 of the tire 25.

The annular wall portion 201 of the tire trim ring 20 is preferably formed radially outwardly adjacent the said outer annular groove 203 therein somewhat more flexible than elsewhere so as to assure the formation of the said air space A between the wall 24 of the tire 25 and the said annular wall portion 201 of the tire trim ring 20 when tire trim-wheel trim construction embodying the invention is mounted on a vehicle wheel. In other words, the annular wall portion 201 of the tire trim ring 20 should be sufficiently thin to flex readily for the purpose of assuming a proper attitude to form the said air space A and to permit flexing of the said wall portion 201 of the tire trim ring 20 when the wall 24 of the tire 25 flexes responsive to the turning of the vehicle wheel 21 as the vehicle is being driven. This flexing creates a pumping action constantly changing the air within the air space A with ambient air whereby to insure proper cooling of the wall 24 of the tire 25.

In FIG. 1, one of the more recent designs of a vehicle wheel 21 is shown with a tubeless tire 25 thereon. In this particular wheel and tire construction, and in other wheel and tire constructions, the scuff line of the tire 25 extends more or less axially outwardly from the lip 22 of the rim 23 of the vehicle wheel 21. In the particular tire 25 shown in the drawing, the wall 24 thereof is provided with a scuff rib or bear 240 molded integrally with the said tire wall 24. This scuff rib or bead 240 is preferably located at the bulge line of the tire 25. The outer peripheral edge 2010 of the wall portion 201 of the tire trim ring 20 is preferably located somewhat axially and radially inwardly of the bulge line or scuff rib 240 of the tire 25 to prevent scuffing of the tire trim 20 on curbs and the like, and to provide an improved color stripe effect at the juncture of the tire 25 and the wheel trim 26, the said wheel trim 26 at least covering the annular bead portion 200 of the tire trim 20 and the lip 22 and a portion of the rim 23 of the vehicle wheel 21.

By making the wall portion 201 of the tire trim ring 20 relatively wide, the standard white wall or color wall tire effect may be produced, in which event the outer periphery of the tire trim ring 20 would lie slightly inwardly of the said scuff rib 240 of the tire 25. However, the employment of a relatively narrow wall portion 201 of the tire trim ring 20 as shown in FIGS. 1, 2, 6 and 16 is preferable since a narrow color stripe or narrow white wall or color wall provides a very desirable aesthetic effect with the smaller diameter wheels and tires recently adopted by most motor vehicle manufacturers.

The wheel trim 26 is shown in the drawings as a relatively narrow ring and is formed annularly of stainless steel or the like to produce the desired ornamental effect and to cover the lip 22 of the wheel rim 23 and the annular bead portion 200 of the tire trim ring 20. The outer periphery of the wheel trim ring 26 is preferably formed generally angular in cross section as best shown in FIGS. 1, 2, 7 and 12, and is provided with an axially inwardly disposed outer annular flange 260 which registers with and engages itself in the axially outwardly facing groove 203 of the tire trim ring 20 to urge it both concentrically onto the lip 22 of the rim 23 and firmly against the outer annular end of the said wheel rim lip 22. The said wheel trim ring 26 also is provided with an axially and outwardly disposed inner annular flange 261 which overlies the radially and axially inner corner 206 of the bead portion 200 of the tire trim ring 20. This inner annular flange 261 of the wheel trim ring 26 is of a suitable arcuate cross section to engage the trim ring anchor loop 52 of the spring securing means 27 as hereinafter described in detail. The foregoing construction provides the wheel trim ring 26 with an annular angularly open cavity 262 to receive the annular bead portion 200 of the tire trim ring 20. By forming the stainless steel wheel trim ring 26 relatively narrow and by using a relatively narrow white or colored tire trim ring 20 therewith, a larger than normal white wall or color wall tire effect may be obtained with the use of a standard size black wall tire.

Although the said wheel trim ring 26 may be a complete ring rolled and butt welded together, it is desirable, and under many conditions preferable, to form the said wheel trim ring 26 with a slip joint 60 as best shown in FIGS. 6, 7, 9, 11 and 15. In which event, the wheel trim ring 26 is first rolled substantially circular with an open joint 600 as shown in FIG. 8, the cross section thereof being preferably as shown in FIG. 12. The male end 61 of the slip joint 60 of wheel trim ring 26 is preferably coped or otherwise formed as shown in FIGS. 10 and 13. The female end 62 of the slip joint 60 is preferably formed as shown in FIGS. 10 and 14 to telescopingly receive the said male end 61. The said male and female ends 61 and 62 respectively of the slip joint 60 are telescoped together as shown in FIGS. 6, 7, 9, 11 and 15 to provide a complete wheel trim ring 26. Obviously, other slip type joints 60 may be employed, it being desirable of course to make the said slip joint 60 as visibly innocuous as possible. The advantages of using a slip jointed wheel trim ring 26 will be hereinafter described in detail.

A typical vehicle wheel 21 including a tire 25 mounted thereon of the type that may have tire trim-wheel trim combination embodying the invention applied thereto is shown in FIGS. 1, 2 and 6. The said vehicle wheel 21 has a drop center rim 23 composed of a central channel or drop center 28 having side walls 29 and a base 30. A tire bead seat 31 extends laterally outwardly from each of the channel side walls 29 and has a tire bead flange 32 extending upwardly therefrom which is curved at its upper portion to terminate in an axially disposed outer lip 22. Within the center of the drop center rim 23 is a spider 33 having an axially disposed flange 34 which generally is secured to the central channel 28 of the drop center rim 23 by such means as welding at 35. The spider 33 is provided with a hub aperture 36 and securing stud holes 37 to accommodate respectively the wheel hub 38 and studs 39 extending from the brake drum 40 to which the wheel 21 is secured by means of the usual wheel securing nuts 41. The flange 34 of the spider 33 is generally scalloped out and formed at 340 at intervals around the periphery thereof to provide added structural strength to the vehicle wheel 21. The spider 33 is preferably provided with a plurality of hub cap retainer nubs 42 over which a hub cap 43 is sprung for securement onto the vehicle wheel 21. The particular tire 25 illustrated in FIG. 1 is a modern tubeless tire, and, if a tubeless tire 25 is used on the vehicle wheel 21, a valve stem 44 is mounted in sealed relationship through the valve stem aperture 440 provided in the drop center rim channel 28 of the said wheel 21.

The securing clips 27 preferably employed to secure the tire trim-wheel trim 20 and 26 onto the vehicle wheel 21 through the medium of the wheel trim ring 26 are each preferably formed of a strip of spring steel to provide a rim loop 50 and a trim ring anchor loop 52 connected together by a short generally tangential arm 51, the said trim ring anchor loop 52 terminating into an inner angularly related anchor arm 53 preferably formed with a plurality of sharp or pointed teeth 54 at the end thereof. The said trim ring anchor loop 52 is preferably provided with suitable protuberances 55 struck out therefrom and located to contact the outer surface of the tire bead flange 32 of the wheel rim 23 when the said securing clips 27 are mounted thereon.

The spring securing clips 27, preferably five of them, are sprung relatively tightly onto the lip 22 of the tire bead flange 32 of the rim 23 of the vehicle wheel 21 in uniform circumferentially spaced relationship therearound. This is accomplished by placing the space 56 between the outer end of the rim loop 50 and the anchor arm 53 of the securing clip 27 over the end of the lip 22 of the rim 23, and then tapping the anchor loop 52 (also termed the head of the clip) lightly with a hammer or the handle of a screw driver. This causes each said spring securing clip 27 formed as shown in FIGS. 3 and 4 to assume a position in respect to the lip 22 and the tire bead flange 32 as shown in FIG. 5 with the free end of the rim loop 50 of the securing clip in substantial contact with the top of the lip of the rim 22, with the protuberance 55 of the trim ring anchor loop 52 thereof in contact with the tire bead flange 32 of the wheel rim 23, and with the toothed end 54 of the anchor arm 53 of the said securing clip 27 disposed in abutment and in vise-like biting engagement with the underside of the said lip 22 of the rim 23.

The tire trim ring 20 and the wheel trim ring 26 are assembled into a tire trim-wheel trim assembly 20 and 26 interlocking the annular bead portion 200 of the tire trim ring 20 into the annular angularly open cavity 262 of the wheel trim ring 26. If a slip jointed wheel trim ring 26 is employed, when assembling the tire trim ring 20 and the wheel trim ring 26 into the said tire trim-wheel trim assembly 20 and 26, the slip joint 60 of the tire trim ring 20 should be disposed opposite the notch 205 in the annular bead portion 200 of the tire trim ring 20 communicating with one of the notches 204 therein. This assembly, although preferably done at the factory, may be readily accomplished by the customer if the tire trim ring 20 and the wheel trim ring 26 are shipped disassembled.

After the wheel trim securing clips 27 are fixed to the lip 22 of the rim 23 of the vehicle wheel 21 as hereinbefore described in detail, the tire-trim-wheel trim assembly 20 and 26 is positioned centrally over the clips 27 making sure that the five pockets or notches 204 in the tire trim ring 26 are disposed substantially centrally over the five evenly circumferentially spaced securing clips 27. The axially and outwardly disposed inner annular flange 261 of the wheel trim 26 is then slid firmly under the trim ring anchor loop 52 of at least two wheel trim securing clips 27 and is held firmly in such position with one hand while forcing the said inner annular flange 261 of the wheel trim ring 26 over the other securing clips 27 by striking the said wheel trim ring 26 with the heel of the hand approximately at the location of each of the other securing clips 27. The tire trim-wheel trim assembly 20 and 26 is now axially and concentrically positioned onto the vehicle wheel 21 with the bead portion 200 of the tire trim ring 20 telescoped over the lip 22 of the rim 23 thereof and with the outer peripheral portion of the annular wall portion 200 of the said tire trim ring 20 in contact with the wall 24 of the tire 25.

The wheel trim ring 26 of the tire trim-wheel trim assembly 20 and 26 is now expanded radially and circumferentially by first hand-squeezing it toward the tire preferably at the slip joint 60 thereof adjacent one of the securing clips 27 while tapping it radially outwardly at each of the other clip locations with the heel of the hand, with a wooden handle of a screw driver, or with a rubber hammer, whichever is convenient. This completes the installation of a tire trim-wheel trim assembly onto a vehicle wheel, and positions one wall of the annular groove 202 of the bead portion 200 of the tire trim ring 20 firmly against the underside of the lip 22 of the rim 23 of the vehicle wheel 21, and holds the base of the said groove 202 of the bead portion 200 of the tire trim ring 20 axially in abutment with the axially outer end of the said lip 22 of the wheel rim 23. The rotation of the vehicle wheel 21 while the vehicle is being driven creates centrifugal force which constantly urges the tire trim ring 20 of the wheel trim-tire trim assembly 20 and 26 into an extremely firm and perfectly concentric relationship onto the lip 22 of the rim 23 of the said vehicle rim 21, and, at the same time, the annular inner flange 261 of the wheel trim ring 26 is constantly urged into firm engagement with and under the trim ring anchor loop 52 of all of the spring securing clips 27.

To remove the tire trim-wheel trim assembly 20 and 26 from a vehicle wheel, it is pried therefrom by inserting a screw driver blade or the like between the lip 22 of the wheel rim 23 and the inner portion of the tire trim ring 20 at the bead portion 200 thereof preferably adjacent one of the spring securing clips 27, and then twisting the screw driver blade slightly. This causes the trim ring anchor loop 52 of the securing clip or clips 27 adjacent the area of prying to rotate with a toggle-like action outwardly about the toothed end 54 of the anchor arm 43, and the said tire trim-wheel trim assembly 20 and 26 then snaps free of all of the said spring securing clips 27 by the said toggle-like action of the said spring securing clips 27. During this toggle-like action, if the wheel trim ring 26 is provided with a slip joint 60, it may contract somewhat at the said slip joint 60, or, the said wheel trim ring 26 may deflect slightly oval during the said toggling action of the spring securing clips 27, all depending upon the relative spring resistance to the toggling of the securing clips 27 and the stiffness of the wheel trim ring 26. The resiliency of the spring securing clips 27 is preferably selected so that a relatively large amount of toggling action is obtained during the removal of the tire trim-wheel trim assembly 20 and 26 from a vehicle wheel 21 thereby utilizing only a minimum amount of distortion of the wheel trim ring 26 in the said removal of the tire trim-wheel trim assembly 20 and 26, thus preventing damage to or a permanent set taking place in the wheel trim ring 26 during the removal of the tire trim-wheel trim assembly 20 and 26 from a vehicle wheel 21.

Although but a single embodiment of the invention has been disclosed and described in detail, it is obvious that many changes may be made in the size, shape, arrangement and detail of the various elements of the invention without departing from the spirit and scope thereof as defined by the appended claims.

I claim:

1. In combination, tire trim for tires of vehicle wheels comprising an annular resilient tire trim ring composed of an inner bead portion formed to overlie the lip of the wheel rim and an outer annular wall portion adapted to conform only adjacent its outer periphery to the wall of the vehicle tire responsive to axial pressure applied to said tire trim ring at said bead thereof, an angularly shaped annular wheel trim ring including an axially and outwardly disposed inner annular flange, resilient clip means disposed on said wheel rim lip engaging said wheel trim ring at said inner annular flange thereof when telescoped axially thereover securing said wheel trim ring onto said wheel and thereby fixing said tire trim ring onto said wheel rim with the bead portion thereof disposed axially and concentrically onto said wheel rim lip and with the outer periphery of the said wall portion of said tire trim in resilient contact with the wall of said tire, the said wheel trim ring including a slip joint therein thereby being expandible radially and circumferentially firmly against said tire trim bead and said clips responsive to centrifugal force as said vehicle is being driven.

2. In combination, tire trim for tires of vehicle wheels comprising an annular resilient tire trim ring composed of an inner bead portion formed to overlie the lip of the wheel rim and an outer annular wall portion adapted to overlie and trim the wall of the vehicle tire, and an angularly shaped metal wheel trim ring including an axially and outwardly disposed inner annular flange and formed to overlie said tire trim bead, spring clip means sprung onto the lip of said wheel rim removably securing said wheel trim ring axially on said wheel, said wheel trim ring engaging the inner bead portion of said tire trim ring and fixing it concentrically onto the lip of the rim of said wheel, said wheel trim ring being radially and circumferentially expansible into firm contact with securing clip means responsive to centrifugal force during the rotation of the vehicle wheel.

3. In combination with a vehicle wheel including a rim and a tire mounted thereon, means for trimming the tire of said vehicle wheel comprising a resilient annular tire trim ring including an inner annular bead portion and an arcuately formed outer wall portion, securing clip means telescoped onto the lip of the wheel rim and sprung radially and axially inwardly against the tire bead flange of said wheel rim, said bead portion of said tire trim ring having an inner annular groove and circumferentially spaced pockets therein to permit said bead portion to be telescoped annularly onto the lip of the rim of said wheel and over said spring clips, and a securing ring formed with an annular angularly open cavity therein and interlocked thereat with the bead portion of said wheel trim forming a substantially unitary tire trim-wheel trim assembly, said securing ring including a curled inner peripheral flange formed to be sprung into engagement with said clip means removably fixing said unitary tire trim and securing ring assembly concentrically onto said vehicle wheel with said bead portion of said tire trim telescoped onto the lip of the wheel rim.

4. In combination with a vehicle wheel including a rim having an axially disposed lip and a tire mounted on said rim, means for trimming the tire on said wheel comprising a resilient annular tire trim ring including an annular bead portion and an outer arcuately formed wall portion adapted to flex against the wall of said tire when the inner annular bead portion is positioned over the lip of said wheel rim, spring clip means telescoped onto the lip of the wheel rim and sprung radially and axially inwardly against the side of said wheel rim, said spring clip means including an anchor loop abutting the tire bead flange of said wheel rim, said bead portion of said tire trim ring having an inner annular groove and circumferentially spaced pockets therein to permit said bead portion to be telescoped annularly onto the lip of the rim of said wheel and over said spring clips, and a securing ring interlocked with the bead portion of said tire trim ring having an inner curled periphery sprung axially over and into locking engagement with said anchor loop of said clip means removably fixing said tire trim ring axially and concentrically onto said vehicle wheel, said spring clip means being capable of a toggle-like action to facilitate removal of said securing ring and the tire trim ring interlocked therewith from said vehicle wheel.

5. The combination as claimed in claim 4 wherein the securing ring is provided with a slip joint to permit it to be expanded circumferentially and radially into firm contact with said clips responsive to centrifugal force created by the rotation of the vehicle wheel.

6. In combination with a vehicle wheel including a rim and a tire mounted thereon, means for trimming the tire of said vehicle wheel comprising a resilient annular tire trim ring including an inner annular bead portion and an arcuately formed outer annular wall portion, clip means telescoped onto the lip of the wheel rim and sprung radially and axially inwardly in abutment with the tire bead flange of said wheel rim, said bead portion of said tire trim ring having an inner annular groove therein to permit said bead portion to be telescoped annularly onto the lip of the rim of said wheel, and a securing ring overlying and assembled onto the annular inner bead portion of said tire trim ring including an inner curled periphery sprung axially into engagement with said clip means removably fixing said tire trim ring onto said vehicle wheel with at least the outer peripheral portion of the said arcuately formed annular wall thereof disposed against the outer wall of said tire, said securing ring including a telescopic joint therein permitting radial and circumferential expansion thereof in respect to the lip of said wheel rim after engagement with said clip means.

7. In combination with a vehicle wheel rim including a circumferentially disposed radial outer tire bead flange terminating in an axially disposed circumferential lip and a tire mounted on said wheel rim, a tire trim element consisting of an annular bead portion and an arcuately formed generally radially disposed outer portion, a plurality of loop type clips spaced around said lip overlying the radially outer surface thereof and formed to bitingly engage the radially inner surface thereof, the said annular bead portion of said tire trim element having an axially inner annular groove therein forming a radially facing inner annular seat bearing against the radially inner surface of said circumferential wheel rim lip when said tire trim bead portion is positioned on the lip of said rim, said tire trim bead portion being notched opposite said clips to avoid interference therewith, and an annular securing ring generally angular in cross section having radially outwardly and axially inwardly disposed legs assembled in juxtaposition with the radially outer and axially inner faces of the bead portion of said tire trim element, the radially outwardly disposed leg of said securing ring including a flange engaging the radial outer periphery of the annular bead portion of said tire trim element, the axially inwardly disposed leg of said securing ring including a curled flange for engagement with said clip means removably fixing said securing ring and tire trim ring assembly onto said vehicle wheel with at least a portion of said tire trim ring disposed adjacent the outer wall of said tire.

References Cited in the file of this patent

UNITED STATES PATENTS

| | | |
|---|---|---|
| 499,859 | Toomay | June 20, 1893 |
| 2,329,854 | Rubsam | Sept. 21, 1943 |
| 2,573,996 | Spencer | Nov. 6, 1951 |
| 2,696,409 | Barnes | Dec. 7, 1954 |
| 2,749,184 | Wood | June 5, 1956 |
| 2,819,119 | Perrin | Jan. 7, 1958 |
| 2,915,335 | Barnes | Dec. 1, 1959 |
| 2,926,960 | Lyon | Mar. 1, 1960 |

FOREIGN PATENTS

| | | |
|---|---|---|
| 1,061,278 | France | Nov. 25, 1953 |